United States Patent
Huang

(10) Patent No.: US 9,036,348 B2
(45) Date of Patent: May 19, 2015

(54) HEAT DISSIPATING MODULE

(71) Applicant: ASUSTeK COMPUTER INC., Taipei (TW)

(72) Inventor: Yung-Ching Huang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 119 days.

(21) Appl. No.: 13/656,087

(22) Filed: Oct. 19, 2012

(65) Prior Publication Data

US 2013/0120935 A1 May 16, 2013

(30) Foreign Application Priority Data

Nov. 11, 2011 (TW) .............................. 100141244 A

(51) Int. Cl.
*H05K 7/20* (2006.01)
*G06F 1/20* (2006.01)
*F04D 29/54* (2006.01)

(52) U.S. Cl.
CPC ........................ *G06F 1/20* (2013.01)

(58) Field of Classification Search
CPC .................. G06F 1/16–1/1654; G06F 1/1656; G06F 1/1662–1/1681; G06F 1/1684–1/189; G06F 1/20; G06F 1/203; G06F 1/206; G06F 2200/201; G06F 2200/202; G06F 2200/203; H05K 5/00; H05K 5/0026; H05K 5/0082; H05K 5/0021; H05K 5/0086–5/06; H05K 5/069; H05K 7/005–7/08; H05K 7/20; H05K 7/00; H05K 7/1422; H05K 1/0218–1/0219; H05K 1/00; H05K 3/00; H05K 9/00; H01G 2/00; H01G 4/00; H01G 5/00; H01G 7/00; H01G 9/00–9/155; H01G 11/00; H02G 3/00; H02G 5/00; H02G 7/00; H02G 9/00; H02G 11/00; H02G 13/00; H02G 15/00; H01B 7/00; H01B 11/00; H01B 17/00; H01R 4/00; H01R 9/00; H01R 13/00; H01K 1/00; H01K 3/00; H02B 1/00; H01H 37/00
USPC ....................... 361/679.46–679.54, 688–723; 417/423.5, 423.15, 423.14, 352–354; 415/191, 192, 208.1, 208.3; 310/60–64, 71–72; 454/184; 165/80.2–80.3, 185; 257/712, 257/721–722; 174/547–548

See application file for complete search history.

(56) References Cited

U.S. PATENT DOCUMENTS

| | | | | |
|---|---|---|---|---|
| 4,428,719 A | * | 1/1984 | Hayashibara et al. | 417/354 |
| 6,491,502 B2 | * | 12/2002 | Hunt | 417/360 |
| 6,671,177 B1 | * | 12/2003 | Han | 361/719 |
| 7,262,965 B2 | * | 8/2007 | Cheng | 361/697 |
| 7,382,616 B2 | * | 6/2008 | Stefanoski | 361/698 |

(Continued)

FOREIGN PATENT DOCUMENTS

| | | |
|---|---|---|
| CN | 1506791 | 6/2004 |
| CN | 2813944 | 9/2006 |

(Continued)

*Primary Examiner* — Michail V Datskovskiy
*Assistant Examiner* — Razmeen Gafur
(74) *Attorney, Agent, or Firm* — Muncy, Geissler, Olds & Lowe, P.C.

(57) ABSTRACT

A heat dissipating module includes a housing, a first fan and a second fan. The housing has a partition. The first fan is disposed at a side of the partition, and the second fan is disposed at the other side of the partition. The second fan has a plurality of wind deflectors, which are disposed higher than the partition.

9 Claims, 4 Drawing Sheets

(56) References Cited

U.S. PATENT DOCUMENTS

| | | | |
|---|---|---|---|
| 7,715,179 B2* | 5/2010 | Wang | 361/679.02 |
| 8,040,674 B2* | 10/2011 | Chen et al. | 361/697 |
| 8,059,403 B2* | 11/2011 | Chou et al. | 361/695 |
| 8,212,187 B2* | 7/2012 | Lasko | 219/386 |
| 2002/0100289 A1* | 8/2002 | Davis | 62/419 |
| 2003/0011989 A1* | 1/2003 | Chan | 361/695 |
| 2004/0005215 A1* | 1/2004 | Della Mora | 415/119 |
| 2005/0088818 A1* | 4/2005 | Chou | 361/695 |
| 2006/0021735 A1* | 2/2006 | Lopatinsky et al. | 165/80.3 |
| 2006/0024183 A1* | 2/2006 | Lauzon | 417/423.14 |
| 2006/0079169 A1* | 4/2006 | Kuo | 454/184 |
| 2006/0196643 A1* | 9/2006 | Hata et al. | 165/104.33 |
| 2008/0093056 A1* | 4/2008 | Hwang et al. | 165/104.33 |
| 2008/0095565 A1* | 4/2008 | Ray | 400/617 |
| 2009/0046428 A1* | 2/2009 | Hung et al. | 361/697 |
| 2009/0145578 A1* | 6/2009 | Lin et al. | 165/80.2 |
| 2009/0174294 A1* | 7/2009 | Dessirier et al. | 310/60 A |
| 2009/0290293 A1* | 11/2009 | Wang | 361/601 |
| 2010/0002386 A1 | 1/2010 | Chou | |
| 2010/0164421 A1* | 7/2010 | Dishman et al. | 318/478 |
| 2011/0017430 A1* | 1/2011 | Lian et al. | 165/104.26 |
| 2011/0061400 A1* | 3/2011 | Park et al. | 62/3.2 |
| 2011/0103015 A1* | 5/2011 | Hirano et al. | 361/695 |
| 2011/0150651 A1* | 6/2011 | Zha et al. | 416/120 |
| 2011/0176916 A1* | 7/2011 | Liang et al. | 415/203 |
| 2011/0292604 A1* | 12/2011 | Janes et al. | 361/695 |

FOREIGN PATENT DOCUMENTS

| | | |
|---|---|---|
| TW | I318097 B | 12/2009 |
| TW | M412251 U1 | 9/2011 |

\* cited by examiner

HEAT DISSIPATING MODULE

CROSS REFERENCE TO RELATED APPLICATIONS

This Non-provisional application claims priority under 35 U.S.C. §119(a) on Patent Application No(s). 100141244 filed in Taiwan, Republic of China on Nov. 11, 2011, the entire contents of which are hereby incorporated by reference.

BACKGROUND OF THE INVENTION

1. Field of Invention

The disclosure relates to a heat dissipating module and, in particular, to a heat dissipating module for dissipating the heat from electronic elements.

2. Related Art

The computer parts nowadays, such as central processing units, memory cards, display cards and etc, need to process more and more information and become faster in performance. Taking display cards for example, the processing chip of a commercial display card comprises hundreds or thousands of transistors, and the higher performance display card usually comprises the processing chips with larger number of transistors. The number of the transistors is one of the important factors that influence the heat producing efficacy while the processing chip is operating. The higher efficiency, the more transistors a display card comprises and the higher the heat producing efficacy. Thus, the temperature of the display card is so high while operating which seriously influence the safety and stability of the display card while operating.

Therefore, a heat dissipating module is added to the processing chip of the higher level display card for exhausting the heat produced by the processing chip and to prevent the processing chip from exceedingly high temperature. In the conventional art, the heat dissipating module comprises a fan for dissipating the heat from the electronic apparatus. However, the heat is easy to accumulate within the electronic apparatus and can not be exhausted. This circumstance reduces the heat dissipating efficiency and shortens the lifespan of the electronic elements and the heat dissipating module.

SUMMARY OF THE INVENTION

A heat dissipating module of the disclosure is configured for dissipating heat from an electronic apparatus. The heat dissipating module comprises a housing, a first fan and a second fan. The housing comprises a partition. The first fan is disposed at a side of the partition, and the second fan is disposed at the other side of the partition. The second fan comprises a plurality of wind deflectors, and the wind deflectors are higher than the partition.

In one embodiment, the first fan is an axial flow fan, and the second fan is a centrifugal fan.

In one embodiment, the electronic apparatus is a display card, a central processing unit or a chipset.

In one embodiment, the wind deflectors are U-shape, V-shape, or semi-circle.

In one embodiment, the housing further comprises an inlet and an outlet, the first fan is disposed corresponded to the inlet, and the second fan is disposed corresponded to the outlet.

In one embodiment, the second fan comprises a second shaft and a second impeller, and the second impeller is disposed around the second shaft.

In one embodiment, the wind deflectors are disposed at one side of the second shaft.

In one embodiment, the second impeller is disposed lower than the partition.

In one embodiment, the first fan is connected with a power module and the power module provides a power to the first fan.

As mentioned above, the heat dissipating module of this disclosure comprises a housing, a first fan and a second fan, and the first and second fans are separated by a partition. By utilizing the structure of the housing to guide the wind sent from the first fan to the wind deflectors of the second fan to motivate the second fan to rotate and exhaust the wind used to dissipate the heat of the electronic apparatus with the rotation of the second fan. The heat dissipating module of this disclosure can effectively utilize the convection to increase the air flow to exhaust the heat, raise the heat dissipation efficiency and rotate the second fan without power supply to reduce power consumption.

These and other features, aspects and advantages of the present invention will become better understood with regard to the following description, appended claims, and accompanying drawings.

DETAILED DESCRIPTION OF THE INVENTION

Figure 1:
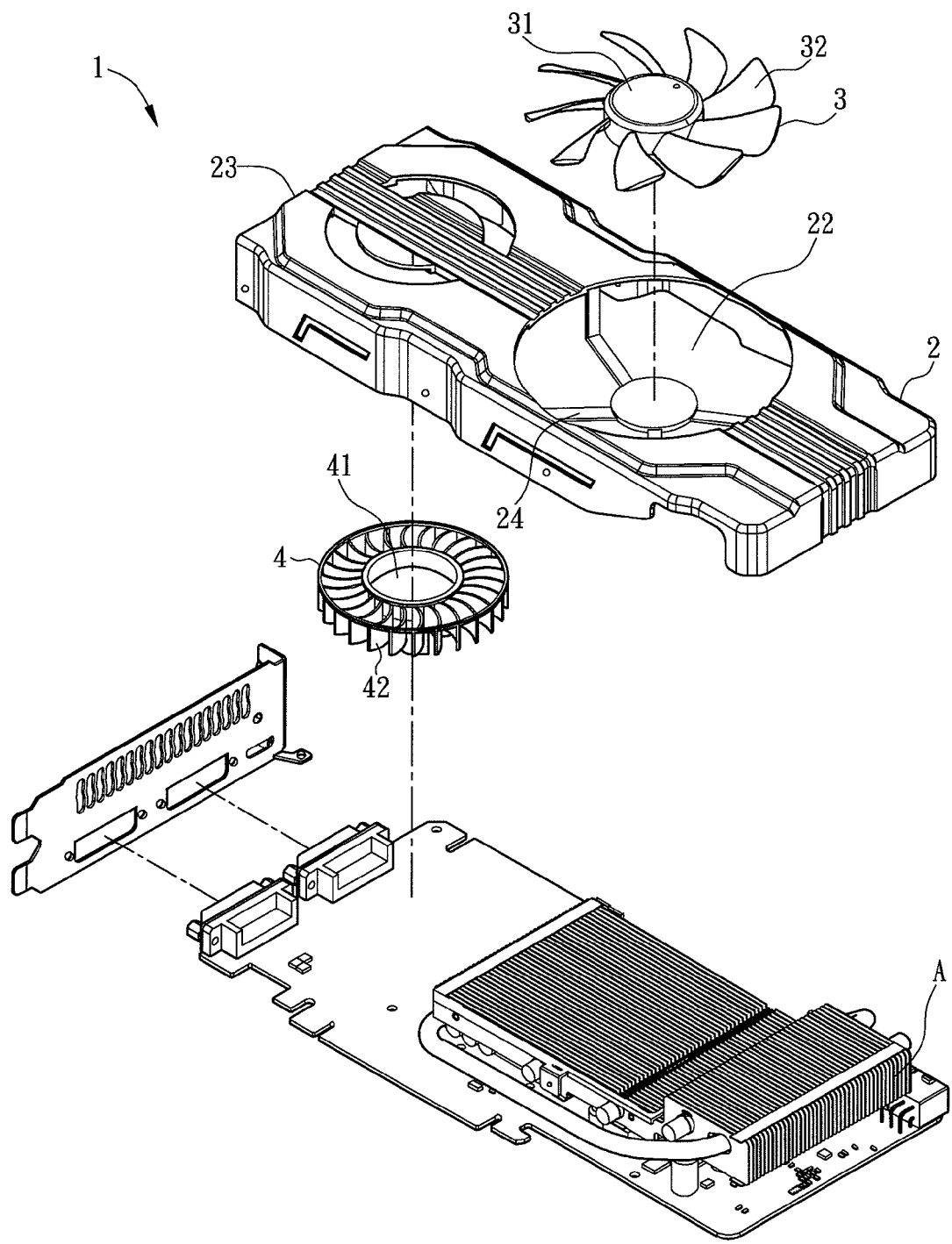
FIG. 1 is an exploded view of a heat dissipating module and an electronic apparatus according to a preferred embodiment of the present disclosure.
Figure 2:
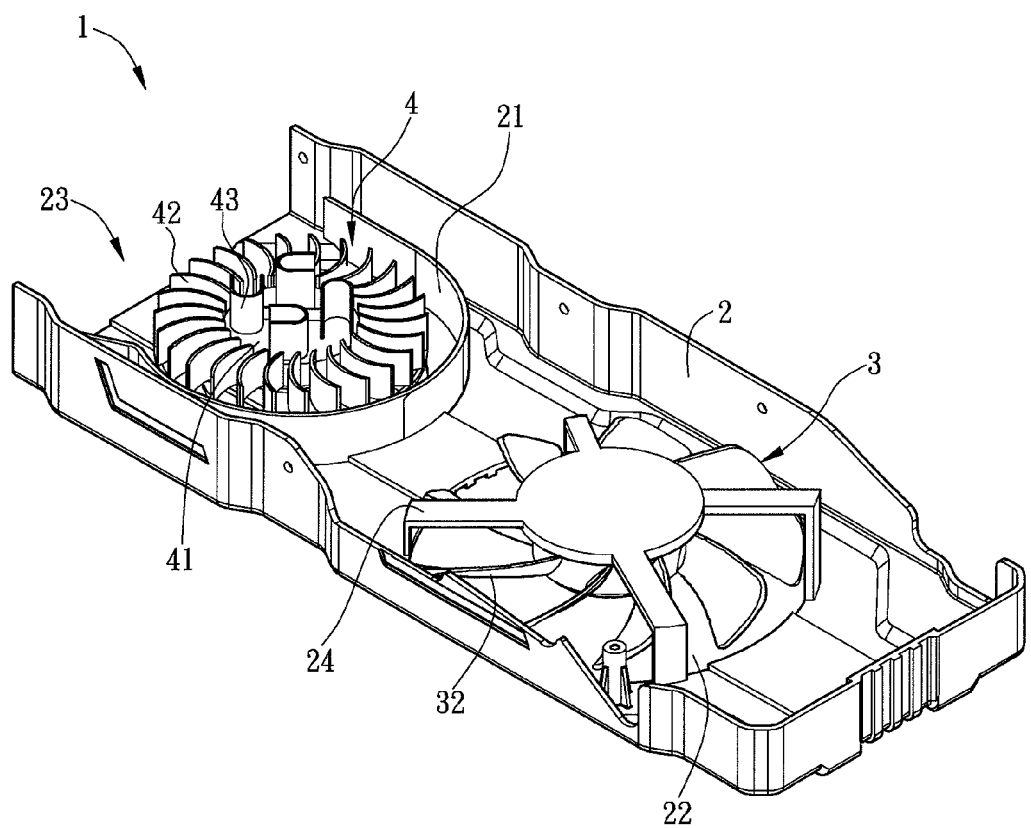
FIG. 2 is a top view of the heat dissipating module of the present disclosure.

FIG. 1 is an exploded view of a heat dissipating module 1 and an electronic apparatus A according to a preferred embodiment of the present disclosure, and FIG. 2 is a top view of the heat dissipating module 1 of the present disclosure. Referring to FIG. 1 and FIG. 2, the heat dissipating module 1 dissipates the heat of the electronic apparatus A and the electronic apparatus A is disposed beneath the heat dissipating module 1. The electronic apparatus A of this embodiment is a display card, but it can be a central processing unit, a north bridge chip or etc in other embodiments. The heat dissipating module 1 comprises a housing 2, a first fan 3 and a second fan 4.

The housing 2 of this embodiment is, for example, rectangular for accommodating the first fan 3 and the second fan 4. In other embodiments, the housing 2 can be designed as other shapes. The housing 2 comprises a partition 21 and the partition 21 is disposed inside the housing 2 for dividing the accommodating space. Besides, the housing 2 can further comprise an inlet 22, an outlet 23 and a fixing frame 24. The size and shape of the partition 21, the inlet 22, the outlet 23 and the fixing frame 24 of this embodiment are only examples, and the disclosure is not limited to this case. It is important that the partition 21 is used to divide the accommodating spaces for the first fan 3 and the second fan 4, thus to form two rooms with different air pressures.

The first fan 3 is disposed in the housing 2 and is corresponded to the inlet 22. The first fan 3 of the embodiment is, for example, an active fan, which is a fan motivated by a motor. For example, the first fan 3 can be an axial flow fan. A first fan 3 comprises a first shaft 31 and a first impeller 32. The first shaft 31 is fixed to a fixing frame 24 of the housing 2. The first impeller 32 is disposed around the first shaft 31. Besides, the first fan 3 is connected to a power module (not shown). The power module provides a power to the first fan 3 to drive the first impeller 32 of the first fan 3 to rotate.

Figure 3:
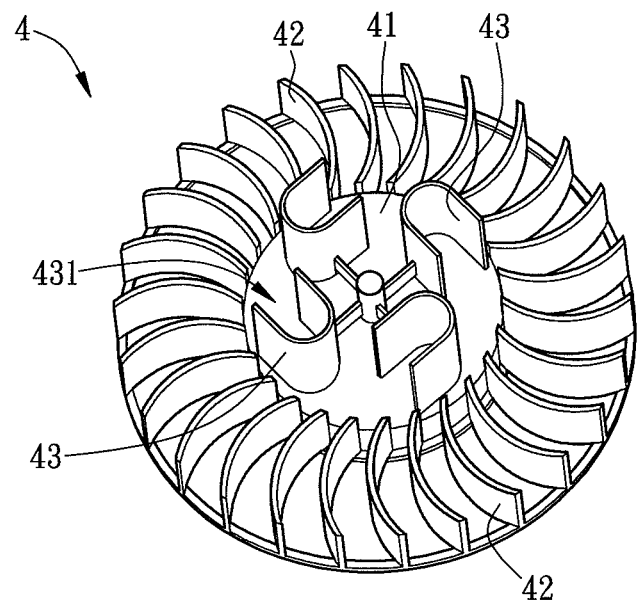
FIG. 3 is a schematic diagram of the second fan of the present disclosure.

The second fan 4 is disposed in the housing 2 and is located at one side of the partition 21 and near the outlet 23. The second fan 4 of the embodiment is, for example, a passive fan, which is a fan without any motor and activated to rotate by the airflow sent from other fan or by operation of other fans. The second fan 4 can be, for example, a centrifugal fan. The second fan 4 comprises a second shaft 41, a second impeller 42 and a plurality of wind deflectors 43. The second shaft 41 can be rotatably fixed on the housing 2 through a supporting frame (not shown). The second impeller 42 is disposed around the second shaft 41 and the wind deflectors 43 are disposed at one side of the second shaft 41. FIG. 3 is a schematic diagram of the second fan of the present disclosure. Referring to FIG. 2 and FIG. 3, the second fan 4 of the embodiment is an example to configure four wind deflectors 43 at one side of the second shaft 41, but the number and the position of the wind deflectors 43 are not limited to this case. In other embodiments, the number of wind deflectors 43 can be two or three. In addition, the wind deflectors 43 comprise an opening 431. The wind deflectors 43 of this embodiment is an example of U-shape, but it can be V-shape, semi-circle or other shapes. The shape with an opening can accumulate and guide wind. The wind deflectors 43 should be disposed in same direction, for example, clockwise. Alternatively, it is also able to dispose the wind deflectors 43 with different shapes in clockwise.

Figure 4:
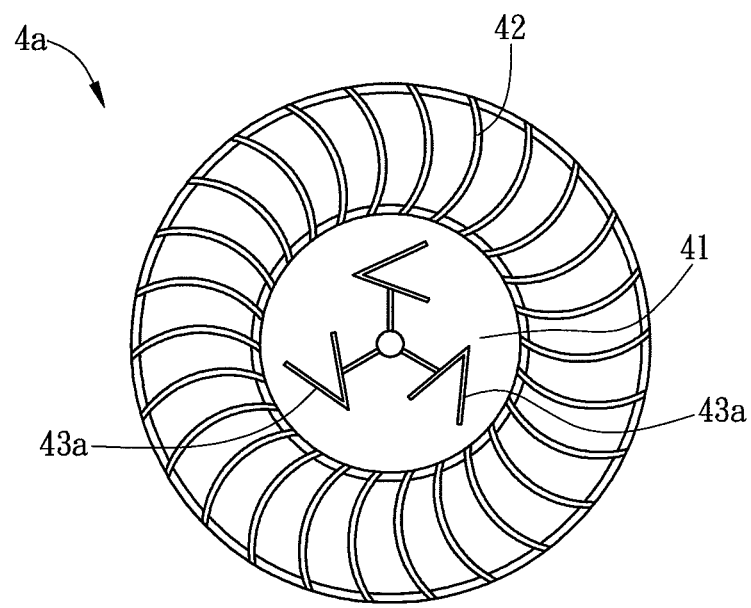
FIG. 4 is a schematic diagram of another aspect of the second fan of the present disclosure.

FIG. 4 is a schematic diagram of another aspect of the second fan of the present disclosure. In this embodiment, referring to FIG. 4, the second fan 4a comprises three wind deflectors 43a and the wind deflectors 43a are V-shape. Referring to FIG. 2 again, it is worth mentioned that the position of the second impeller 42 of the second fan 4 is lower than that of the partition 21 while the position of the wind deflectors 43 is higher than that of the partition 21, that is, the height of the partition 21 is higher than the second impeller 42 of the second fan 4 and lower than the height of the wind deflectors 43 and the housing 2. Thus, this configuration can make the wind sent by the first fan 3 directly flow to the wind deflectors 43 to motivate the second fan 4 to rotate, and then the second impeller 42 is able to send the heat to the outlet 23.

Figure 5:
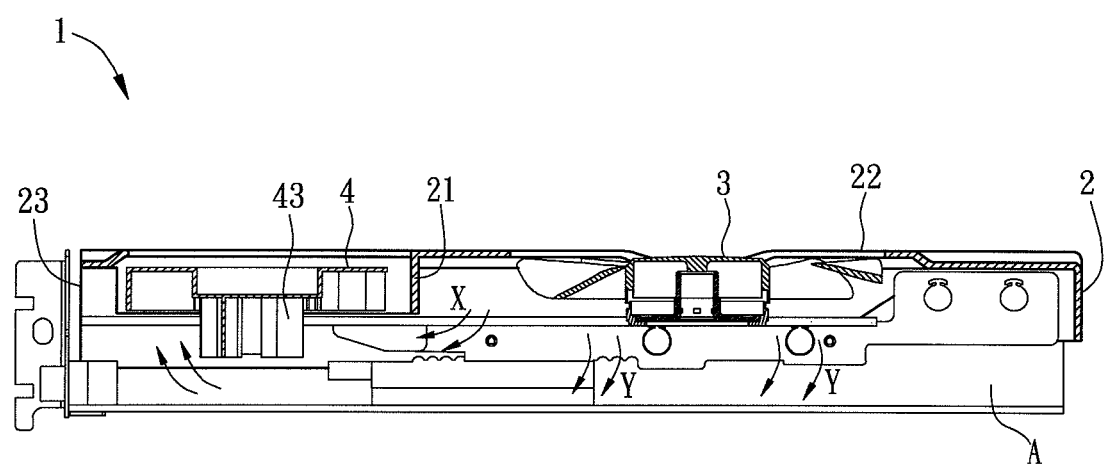
FIG. 5 is a sectional view of the heat dissipating module and the electronic apparatus of the present disclosure.

The above description illustrates the structure of the heat dissipation module 1 of a preferred embodiment. The following are still based on the above mentioned drawings (FIG. 1 to FIG. 2) in view of FIG. 5. FIG. 5 is a sectional view of the heat dissipating module and the electronic apparatus of the present disclosure. The following are the example of the application of the heat dissipation module 1 to explain the wind flow of the heat dissipating module 1.

First, the first fan 3 of the embodiment is an axial flow fan. The inlet and outlet directions of the first fan 3 are in parallel, which is along the axial direction. The second fan 4 of the embodiment is, for example, a centrifugal fan. The inlet and outlet directions of the second fan 4 are perpendicular to each other. Besides, the heat dissipating module 1 is applied to dissipate the heat from the fins of the display card, but the present disclosure is not limited to this case.

The external air enters the first fan 3 through the inlet 22 of the housing 2. The first fan 3 sends the wind from below. A part of the wind passes through the partition 21 and flows to the wind deflectors 43 of the second fan 4 (shown as the arrow X). The wind deflectors 43 accumulate and guide the wind from the first fan 3 to push the second fan 4 to rotate. The other part of the wind flows to the electronic apparatus A (shown as the arrow Y) to dissipate the heat of the electronic apparatus A, then flows to the second fan 4 and then is exhausted from the outlet 23 of the housing 2 with the rotation of the second fan 4. Wherein, the partition 21 is disposed between the first fan 3 and the second fan 4. The height of the partition 21 is higher than or equal to the impeller 42 of the second fan 4; thus, the wind sent from the second fan 4 is not easy to flow back to the first fan 3 and be exhausted from the outlet 23 of the housing 2 with the rotation of the second fan 4.

The first fan 3 of this embodiment is connected to a power module (not shown). The power module supplies the power to drive the first fan 3 to operate and rotate, while the second fan 4 is driven to rotate by accumulating the wind sent by the first fan 3 to the wind deflectors 43 and pushing the wind deflectors 43. As described above, the second fan 4 is not connected to the power module and is driven to rotate by the wind sent from the first fan 3.

In other embodiments, the heat dissipating module can further dissipate the heat of the central processing unit and the chipset by, for example, disposing the first fan corresponding to the central processing unit and disposing the second fan corresponding to the chipset. The external air enters the first fan through the inlet. A part of the wind sent from the first fan flows to the wind deflectors of the second fan to push the second fan to rotate. The other part of the wind dissipates the heat of the central processing unit and then flows to dissipate the heat from the north bridge chip. Then, the other part of the wind flows to the second fan to be exhausted from the outlet with the rotation of the second fan.

Compared with the conventional art, the heat dissipating module of this disclosure utilizes the convection to solve the heat dissipation issue of the electronic apparatus without wasting extra power, thereby increasing the efficiency and lifespan of the heat dissipating module and the electronic apparatus.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A heat dissipating module for dissipating heat from an electronic apparatus, comprising:
    a housing comprising a partition;
    a first fan disposed at a side of the partition; and
    a second fan disposed at the other side of the partition and comprising a shaft, an impeller and a plurality of wind deflectors, wherein the wind deflectors are higher than the partition, the wind deflectors are disposed at one side of the shaft, and the impeller is disposed around the shaft and the wind deflectors.

2. The heat dissipating module according to claim 1, wherein the first fan is an axial flow fan.

3. The heat dissipating module according to claim 1, wherein the second fan is a centrifugal fan.

4. The heat dissipating module according to claim 1, wherein the electronic apparatus is a display card, a central processing unit or a chipset.

5. The heat dissipating module according to claim 1, wherein the wind deflectors are U-shape, V-shape, or semi-circle.

6. The heat dissipating module according to claim 1, wherein the housing further comprises an inlet and an outlet, the first fan is disposed corresponded to the inlet, and the second fan is disposed corresponded to the outlet.

7. The heat dissipating module according to claim 1, wherein the first fan comprises a first shaft and a first impeller, and the first impeller is disposed around the first shaft.

8. The heat dissipating module according to claim 1, wherein the impeller of the second fan is disposed lower than the partition.

9. The heat dissipating module according to claim 1, wherein the first fan is connected with a power module and the power module provide a power to the first fan.

* * * * *